United States Patent [19]

Olyphant, Jr. et al.

[11] 3,832,769
[45] Sept. 3, 1974

[54] CIRCUITRY AND METHOD

[75] Inventors: Murray Olyphant, Jr., Lake Elmo; Robert R. Rohloff, Lakeland, both of Minn.

[73] Assignee: Minnesota Mining and Manufacturing Company, Saint-Paul, Minn.

[22] Filed: May 26, 1971

[21] Appl. No.: 146,984

[52] U.S. Cl. .......... 29/626, 29/589, 29/625, 174/68.5
[51] Int. Cl. .......... H05k 3/32, H05k 3/36
[58] Field of Search .......... 29/624–630 B, 29/589, 577, 591; 174/68.5

[56] References Cited

UNITED STATES PATENTS

| | | | |
|---|---|---|---|
| 3,311,966 | 4/1967 | Shaheen et al. | 29/625 |
| 3,366,519 | 1/1968 | Pritchard, Jr. et al. | 29/625 X |
| 3,385,773 | 5/1968 | Frantzen | 29/625 X |
| 3,436,468 | 4/1969 | Haberecht | 174/68 S |
| 3,488,840 | 1/1970 | Hymes et al. | 29/626 |
| 3,537,176 | 11/1970 | Healy et al. | 29/626 |
| 3,537,176 | 11/1970 | Healy et al. | 29/626 |
| 3,546,775 | 12/1970 | Lalmond et al. | 29/624 X |
| 3,561,107 | 2/1971 | Best et al. | 29/577 |
| 3,570,114 | 3/1971 | Bean et al. | 29/577 |
| 3,597,834 | 8/1971 | Lathrop et al. | 29/576 R |
| 3,622,384 | 11/1971 | Davey | 117/212 |
| 3,689,983 | 9/1972 | Eltzroth et al. | 29/626 |

*Primary Examiner*—Charles W. Lanham
*Assistant Examiner*—Joseph A. Walkowski
*Attorney, Agent, or Firm*—Alexander, Sell, Steldt & Delahunt

[57] ABSTRACT

A method for mounting semiconductor chips to printed circuitry via conductive columns which extend through the dielectric substrate and electrically communicate with a predetermined pattern of conductive leads on the opposite surface of the substrate. Printed circuitry useful for practicing the method is also provided.

18 Claims, 7 Drawing Figures

INVENTORS
MURRAY OLYPHANT JR.
ROBERT R. ROHLOFF
BY Kinney, Alexander
Sell, Steldt & De La Hunt
ATTORNEYS

CIRCUITRY AND METHOD

BACKGROUND OF THE INVENTION

1. Field of the Invention

This invention relates to printed circuitry and, more specifically, to methods for connecting electrical circuitry to printed circuitry.

2. Description of the Prior Art

Various conventional techniques are available for bonding semiconductor chips to printed circuitry. These prior art techniques commonly employ raised conductive bumps, either on the semiconductor chip or on the printed circuit; cantilever beam leads; deformable solder balls; or conductive, non-deformable balls.

However, such methods possess inherent disadvantages. For example, such techniques can result in shorting between closely spaced conductors on the printed circuit or on the chip itself if the technique is not closely controlled. There also may be undesirable flowback of solder along the conductors from the bonding area. Furthermore, such techniques do not insure positive spacing between the semiconductor chip and the printed circuitry. Moreover, the prior art techniques are generally quite expensive and they require the use of several processing steps.

SUMMARY OF THE INVENTION

The present invention provides novel methods and circuitry for mounting semiconductor chips to further circuitry. The method assures positive spacing between the semiconductor chip and the circuitry and also eliminates the undesirable shorting between closely spaced conductors on the chip and on the circuitry. Flowback of solder along conductors from the bonding area is also eliminated.

The novel methods require fewer processing steps and less precise control than is necessary with the prior art techniques. Use of the novel methods also allows unmodified semiconductor devices, i.e., those without raised bumps, to be quickly and easily bonded to printed circuitry without shorting or damage of the device.

DETAILED DESCRIPTION OF THE INVENTION

In accordance with the invention there is provided a method for mounting a semiconductor chip to a printed circuit which comprises:

(*a*) providing a thin, dielectric substrate having a thin, conductive layer bonded to one surface, (*b*) providing a predetermined pattern of a plurality of apertures in the dielectric substrate, the apertures extending through the substrate and communicating with the underside of the conductive layer;

(*c*) forming, in the apertures, conductive columns which electrically communicate with the underside of the conductive layer and which have a portion thereof exposed to the opposite surface for connection to further electrical circuitry, (*d*) converting the conductive layer to a predetermined pattern of conductive land areas, wherein each conductive land area electrically communicates with a separate conductive column, and (*e*) electrically bonding the contact pads of a semiconductor device to the exposed portions of the conductive columns.

The invention also provides a continuous strip of printed circuits, each printed circuit being adapted to receive a semiconductor device on one surface thereof while providing leads to further electrical circuitry on the opposite surface. Each printed circuit comprises:

a a thin, flexible, dielectric substrate having a thickness in the range of about 0.1–10 mils, b a predetermined pattern of conductive land areas bonded to one surface of the dielectric substrate, the conductive land areas having a thickness less than about 5 mils, and c a plurality of conductive columns extending through the substrate, one end of each of the columns electrically communicating with a single conductive land area on one surface of the dielectric substrate, the other end of the conductive column being exposed on the opposite surface of the dielectric substrate, wherein the exposed end of the conductive columns define a site which is adapted to electrically receive a semiconductor device.

The invention will be described in more detail hereinafter with reference to the accompanying drawing wherein like reference characters refer to the same parts throughout the several views and in which.

Figure 3:
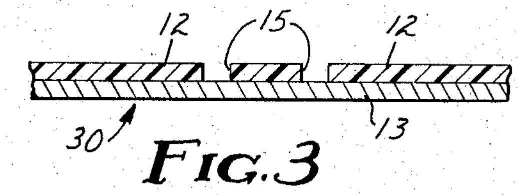
Figure 4:
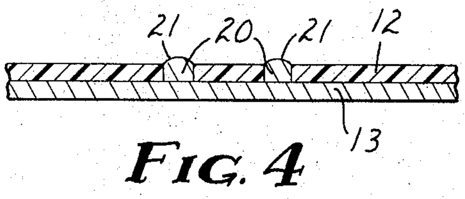
Figure 5:
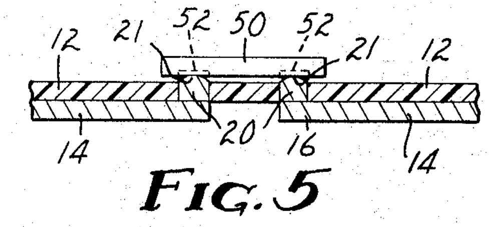
Figure 6:
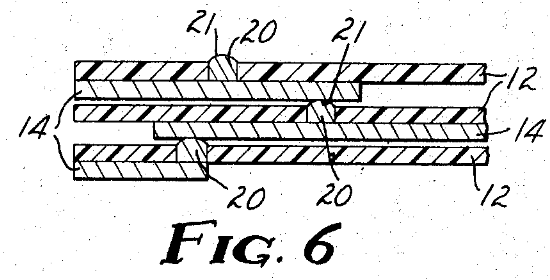

FIGS. 3, 4, and 5 show sequential steps in the practice of the invention;

FIG. 6 shows another manner in which the invention may be practiced; and

Figure 7:
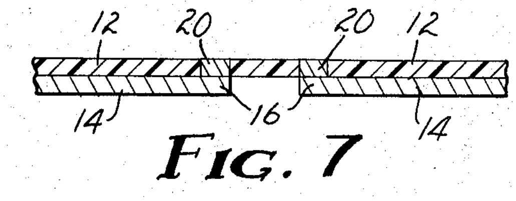

FIG. 7 shows another type of printed circuit useful in the practice of the invention.

Figure 1:
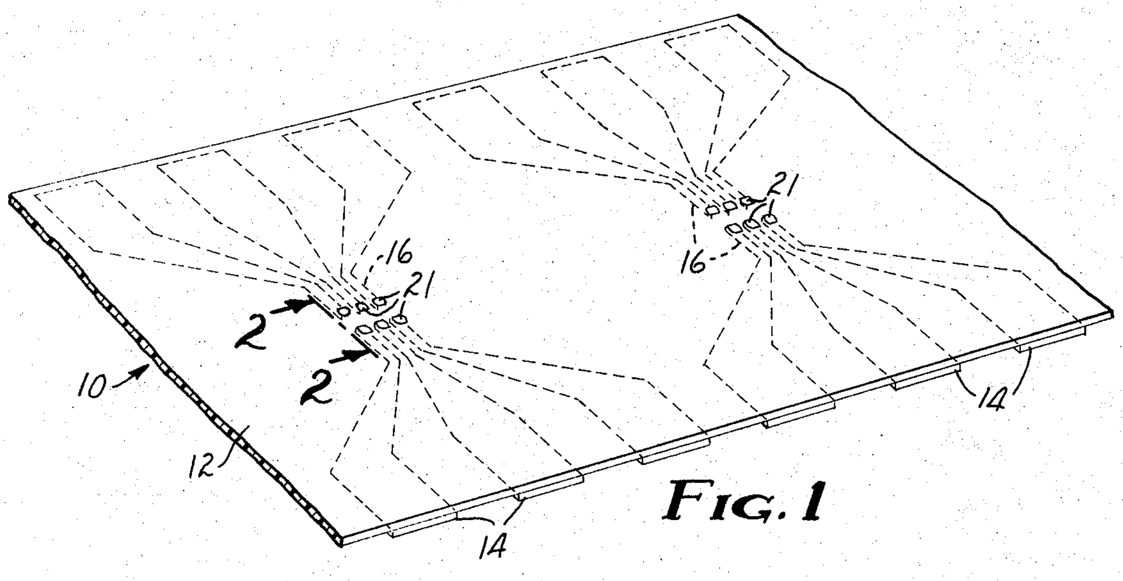
FIG. 1 is a perspective view of a continuous strip of printed circuits.

In FIG. 1 there is shown a continuous strip of printed circuit material 10 which comprises a thin, dielectric substrate 12 having a predetermined, repeating pattern of conductive land areas 14 bonded to one surface of the substrate 12. The conductive land areas 14 are spaced apart from one another and have inner ends 16 which converge to a common area of the substrate. Conductive columns 20 (not shown) extend through the substrate 12 and electrically communicate with conductive land areas 14 on one surface of the substrate. Portions 21 of conductive columns 20 remain exposed on the top surface of the substrate and define a site where a semiconductor device may be later electrically received. For example, a semiconductor device may be mounted or placed on the substrate and then electrically connected to portions 21 with tiny wires, or a semiconductive device may be superimposed in registry over portions 21 and then flip-chip bonded directly to portions 21.

Figure 2:
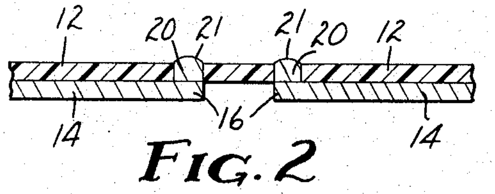
FIG. 2 is a cross sectional view of the strip of printed circuits of FIG. 1.

In FIG. 2 there is shown a cross sectional view of the printed circuit of FIG. 1 taken along section line 2–2. Typically, dielectric substrate 12 is 0.1–10 mils (2.5 microns to 250 microns) in thickness. Preferred dielectric substrates include thin, flexible films of polyimide, polyester, acrylic, fluorocarbon, polysulfone, polyamide, polyolefin, silicone, and glass fiber reinforced thermoplastics.

Conductive land areas 14 are preferably metals such as aluminum, copper, nickel, silver, gold, and the like. Alloys of these metals, either with each other or with other metals such as iron or cobalt, are also very useful, Bimetal strips, e.g., solder plated aluminum or gold plated nickel, have also been useful. The thickness of the conductive land areas must be at least sufficient to allow electrical conductivity and they may be as thick as about 5 mils, although a 1 mil (25 microns) thickness is generally preferred for economic reasons.

Conductive columns 20 typically have diameters in the range of 4–10 mils. The amount by which portions 21 project above the surface of substrate 12 is generally in the range of 0–10 mils.

Conductive columns 20 are preferably metals such as tin/lead solder, gold, nickel, copper and combinations thereof, although other conductive materials such as aluminum, silver, indium, and tin may be used.

Printed circuitry 10 may be prepared following various procedures. Preferably the printed circuitry is prepared by first forming a plurality of apertures in a predetermined pattern in a dielectric substrate which has a continuous conductive layer bonded to one surface thereof. Thus, in FIG. 3 there is shown a printed circuit precursor 30 comprising a dielectric substrate 12 having a continuous conductive layer 13 bonded to one surface thereof. Apertures 15 have been formed in the dielectric substrate 12, and these apertures extend through the substrate and communicate with the underside of conductive layer 13.

Apertures 15 can be formed according to conventional techniques, e.g., chemical milling (e.g., as described in U.S. Pat. No. 3,395,057), laser and electron beam drilling, abrasive techniques or mechanical drilling.

Conductive columns 20 are then formed in apertures 15, as shown in FIG. 4. Thus, conductive columns 20 rest against and electrically communicate with the underside of conductive layer 13 while portions 21 of conductive columns 20 remain exposed for connection to further circuitry, e.g., a semiconductor device or other electrical circuitry. Conductive layer 13 is then converted into a predetermined pattern of conductive land areas 14 (as shown in FIGS. 1 and 2) according to conventional techniques (e.g., photoresist techniques). The predetermined pattern of conductive land areas 14 must be disposed so that converging ends 16 of conductive land areas 14 electrically communicate with one end of conductive columns 20.

Conductive columns 20 are preferably formed by electrodeposition of the desired metal (e.g., as described in U.S. Pat. Nos. 1,364,051 and 2,318,592), although electroless plating can also be used (e.g., as described in U.S. Pat. Nos. 3,269,861 and 3,259,559).

In FIG. 7 there is shown an alternative form of printed circuitry in which the conductive columns 20 do not project above the surface of the dielectric substrate 12. In fact, the columns may extend only partially through the substrate, if desired, so long as a portion of the column remains exposed to the opposite surface of the dielectric substrate.

In FIG. 5 there is shown a semiconductor device 50 having contact pads 52 bonded to exposed portions 21 of conductive columns 20 in the printed circuitry. Although this figure shows flip-chip bonding of the semiconductor device to the printed circuitry, other types of bonding could also be used. For example, beam lead bonding or wire bonding could be used.

In FIG. 6 there is shown another manner for practicing the invention, i.e., for the interconnection of a plurality of printed circuits. In the manner shown, the printed circuits can be stacked upon each other with interconnected being obtained by means of conductive columns 20 which extend through the dielectric substrate to electrically contact the next adjacent pattern of conductive land areas.

What is claimed is:

1. A method for mounting a semiconductor chip to a printed circuit, the method comprising the steps of:

a. providing a thin dielectric substrate having a thin conductive layer bonded to one surface thereof,
b. providing a plurality of apertures in said dielectric substrate, said apertures extending through said dielectric substrate and communicating with the underside of said conductive layer, said apertures defining a predetermined pattern,
c. forming, in said apertures, conductive columns which electrically communicate with the underside of said conductive layer and which have a portion thereof exposed to the opposite surface of the substrate for connection to further electrical circuitry, said columns extending beyond the surface of said substrate,
d. converting said conductive layer to a predetermined pattern of conductive land areas, wherein a portion of the underside of each said conductive land area forming said predetermined pattern electrically communicates with a separate conductive column, and
e. electrically bonding the contact pads of a semiconductor chip to said exposed portions of said conductive columns.

2. A method for mounting a semiconductor chip to a printed circuit, the method comprising the steps of:

a. providing a thin dielectric substrate having a thin conductive layer bonded to one surface thereof,
b. providing a plurality of apertures in said dielectric substrate, said apertures extending through said dielectric substrate and communicating with the underside of said conductive layer, said apertures defining a predetermined pattern,
c. converting said conductive layer to a predetermined pattern of conductive land areas, said predetermined pattern of conductive land areas being disposed so as to overlie said predetermined pattern of apertures,
d. forming, in said apertures, conductive columns which electrically communicate with the underside of said conductive land areas and which have a portion thereof exposed for connection to further electrical circuitry, said columns extending beyond the surface of said substrate, and
e. electrically bonding the contact pads of a semiconductor device to said exposed portions of said conductive columns.

3. A method for mounting a semiconductor chip to a printed circuit, the method comprising the steps of:

a. providing a printed circuit comprising a thin dielectric substrate having a predetermined pattern of conductive land areas bonded to one surface thereof,
b. providing a plurality of apertures in said dielectric substrate, said apertures extending through said dielectric substrate and communicating with the underside of at least a portion of said conductive land areas, said apertures defining a predetermined pattern, c. forming in said apertures conductive columns which electrically communicate with the underside of said conductive land areas and which have a portion thereof exposed for connection to further electrical circuitry, said columns extending beyond the surface of said substrate, and d. electrically bonding the contact pads of a semiconductor chip to said exposed portions of said conductive columns.

4. A method for interconnecting a plurality of printed circuits comprising the steps of:

a. providing a thin dielectric substrate having a thin conductive layer bonded to one surface thereof, b. providing a plurality of apertures in said dielectric substrate, said apertures extending through said dielectric substrate and communicating with the underside of said conductive layer, said apertures defining a predetermined pattern, c. forming, in said apertures, conductive columns which electrically communicate with the underside of said conductive layer and which have a portion thereof exposed for connection to further electrical circuitry, said columns extending beyond the surface of said substrate, d. forming a first printed circuit by converting said conductive layer to a predetermined pattern of conductive land areas, wherein a portion of the underside of each said conductive land areas forming said predetermined pattern electrically communicates with a separate conductive column, e. electrically bonding the exposed portions of said conductive columns of said first printed circuit to a predetermined pattern of conductive land areas of a second printed circuit; said second printed circuit having a plurality of conductive columns extending through a dielectric substrate, one end of each of said columns resting against and electrically communicating with the underside of a single conductive land area of the predetermined pattern of land areas, the other end of said conductive columns extending beyond the opposite surface of the dielectric substrate and being adapted to electrically receive further electrical circuitry.

5. A method in accordance with claim 4, wherein a semiconductor device is subsequently electrically bonded to the exposed ends of the conductive columns of said second printed circuit.

6. A method in accordance with claim 1, wherein said conductive columns comprise tin/lead solder.

7. A method in accordance with claim 1 wherein said conductive columns comprise copper.

8. A method in accordance with claim 7, wherein said copper conductive columns further comprise nickel and gold.

9. A method in accordance with claim 2, wherein said conductive columns comprise tin/lead solder.

10. A method in accordance with claim 3, wherein said conductive columns comprise tin/lead solder.

11. A method in accordance with claim 2, wherein said conductive columns comprise copper.

12. A method in accordance with claim 3, wherein said conductive columns comprise copper.

13. A method in accordance with claim 11, wherein said copper conductive columns further comprise nickel and gold.

14. A method in accordance with claim 12, wherein said copper conductive columns further comprise nickel and gold.

15. A method in accordance with claim 4, wherein said conductive columns of said first printed circuit comprise tin/lead solder.

16. A method in accordance with claim 4, wherein said conductive columns of said first and second printed circuits comprise tin/lead solder.

17. A method in accordance with claim 4, wherein said conductive columns of said first printed circuit comprise copper.

18. A method in accordance with claim 17, wherein said copper conductive columns further comprise nickel and gold.

* * * * *